United States Patent [19]

Rees, Jr. et al.

[11] 4,253,273

[45] Mar. 3, 1981

[54] PRODUCTIVE USE OF CEDAR HOG WASTE

[76] Inventors: David H. Rees, Jr., 315 Chestnut St.; Gerald A. Hickey, 110 West Castle St., both of Mount Shasta, Calif. 96067

[21] Appl. No.: 3,041

[22] Filed: Jan. 12, 1979

Related U.S. Application Data

[62] Division of Ser. No. 843,436, Oct. 18, 1977, Pat. No. 4,154,174.

[51] Int. Cl.$^3$ ............................................. A01G 1/00
[52] U.S. Cl. ................................ 47/58; 47/DIG. 10; 111/1
[58] Field of Search ................ 47/9, 58, 56, DIG. 10; 111/1

[56] References Cited

PUBLICATIONS

Agricultural Uses of Bark Bollen, 1969, USDA Forest Service Res. Paper PNW-77, pp. 18-25.

*Primary Examiner*—Robert E. Bagwill
*Attorney, Agent, or Firm*—Fulwider, Patton, Rieber, Lee & Utecht

[57] ABSTRACT

Remnants of cedar timers, including bark, sawdust, wood chips and the like are spread in a layer upon soil to enhance the growth of vegetables, especially tuberous vegetables, such as potatoes. The cedar remnants provide nutrients for vegetables, retard the growth of weeds, aid in the retention of moisture and inhibit the propagation of harmful insects.

8 Claims, No Drawings

PRODUCTIVE USE OF CEDAR HOG WASTE

This is a division, of application Ser. No. 843,436, filed Oct. 18, 1977 now U.S. Pat. No. 4,154,174, issued on May 15, 1979.

BACKGROUND OF THE INVENTION

1. Field of the Invention

The present invention relates to the use of soil additives and mulches to promote the growth of vegetables and other desirable vegetation.

2. Description of the Prior Art

Man has historically sought to improve the agricultural productivity of crops and other desirable vegetation, such as flowers. Many soil additives and mulches have been developed in attempts to increase crop yield. Such materials function as either fertilizers, mulches or pesticides. Fertilizers contain particular desirable chemical compounds and are mixed with or diseminate into the soil to enrich the soil with required crop nutrients. Mulches, on the other hand, usually are formed of loosely packed material which is generally spread upon the surface of the soil or mixed in surface soil to aid in protecting the roots of crops. Pesticides are frequently employed to protect crops from insects, such as potato beetles, aphids and other pests. The expenditures involved in providing such soil additives, fertilizers and insecticides throughout the United States and elsewhere in enormous.

In the past, there have been repeated attempts to provide effective agricultural soil conditioners at a reduced cost. Mulches comprised of hay or straw have been used to promote the growth of edible crops, (such as potatoes). In the spring, seed potatoes may be laid on top of unharvested crop remnants, such as corn stalks, strawberry plant leaves and hay left from the previous growing season. The seed potatoes may be mulched with a heavy hay blanket and grown therein.

Other systems of crop enhancement have sought to employ wood products as a soil treatment of mulch. In one such system it is suggested that unprocessed wood chips scattered about plants and vegetables may provide an effective mulch. Other systems employ more exotic treatment of wood products before utilizing them as an aid to agriculture. For example, it has been suggested that ground pine bark or sawdust may be mixed with a microbial source, such as ground manure, sewage sludge or industrial waste, and subjected to aerobic decomposition. After processing involving heating and agitation, the resulting material is used as a soil conditioner or mulch. Another suggestion has been to utilize finely shredded fiber and dust-like particles of the bark of the redwood tree as a fertilizer and soil conditioner. However, the high acidity content of wood and wood products when used as a soil conditioner has been recognized and has been considered to be undesirable, although sometimes tolerable. For this an other reason, wood products, when they are used, are frequently subjected to extensive pretreatment prior to application to the soil. For example, the shredded redwood fiber and bark has been reacted with ammonia at elevated pressures and temperatures to improve its nitrogen content. A costly autoclave is required in this connection, however, and the batch processing of redwood bark and dust is ill suited to the large quantities required of soil treatment materials. On the other hand, redwood barks has also, in the past, been used as a filtering agent for sewage waste systems and, after drying, utilized as a fertilizer and soil conditioner. Again, however, expensive and time consuming treatment has been required to transform the redwood material from its natural state to a material useful for application to agricultural soil.

SUMMARY OF THE INVENTION

There presently exists a material which has heretofore been regarded as an undesirable waste by-product, produced by lumber mills that process timber in the manufacture of wooden pencils, cedar boards and other cedar lumber and wood products. This material is known in the trade as "cedar hog fuel" and is a mixture of cedar bark, sawdust and cedar wood. According to the present invention, it has been discovered that these cedar wood processing remnants may be utilized as a soil conditioner to enhance the productivity of certain agricultural crops and to provide other unique and highly desirable benefits as well.

Cedar lumber mill remnants or "cedar hog fuel" is produced in the processing of cedar timbers in a sawmill. In the processing of cedar timbers in the manufacture of wooden casings for lead pencils, the cutting of boards for use in building construction, and for other specialized purposes, cedar logs are cut in varying lengths and are stripped of their bark by a machine called a log barker. This bark is cut away in large chunks and typically falls to a conveyor where it is carried to a device called a hammer hog and then to a storage location. The stripped logs are then longitudinally cut into boards, pencil casing stock, or other convenient sizes with the logs positioned so that the resulting sawdust and other debris also falls on the conveyor and is also transferred to the hammer hog and later to a storage location. These trimmings of cedar logs also include wood chips, splinters, cedar twigs, burls and knots. All of these cedar trimming components are typically mixed together as they are processed through the hammer hog. A hammer hog is a machine employing a massive hammer-like weight to pulverize the cedar trimmings into relatively small particles as they are received from the conveyor. The resulting material emanating from the hammer hog is termed "cedar hog fuel". Cedar hog fuel has heretofore been considered to be largely a nuisance, and has been utilized for value to any significant extent only for the purpose of burning for heat.

According to the present invention, the cedar timber remnants, referred to above as "cedar hog fuel" are utilized either in their raw form directly or after grinding to serve as a mulch and soil additive for certain vegetable crops. It has been found that when so utilized, the cedar trimming remnants tend to retain moisture better than untreated soil. In conventional agricultural practices in growing potatoes, potato fields are soaked with water every third to fifth day. However, when covered with 10 to 13 centimeters of the cedar timber remnants described, the fields require soaking much less frequently. This feature is particularly significant in drought stricken areas where water availability is a concern. Remnants and trimmings of incense cedar may be utilized in accordance with the present invention. Incense cedar is widely utilized in the wood pencil industry. From pine trees are to be avoided, however, and mill remnants containing trimmings from pine trees intermixed with mill remnants containing cedar trimmings cannot be utilized according to the invention. Pine remnants contain excessive concentrations of turpintine and other oleo resins which adversely effect crop growth.

A further feature of the present invention is the weed retardant effect which the cedar bark, sawdust and wood remnants have on the soil in which crops are grown. Weeds are noticeably absent from test plots employing the cedar trimming remnants in accordance with the present invention as contrasted with unenriched soil or soil employing other mulches, such as redwood bark, sawdust and wood chips.

In addition, implementation of the method of the present invention obviates the need for insecticides, which are normally required to suppress potato beetles and other insect pests. It is conventional practice to apply an insecticide to potato fields at least once during the normal four to five month potato growing cycle. In the absence of such an insecticide application, extensive damage from insects usually results. However, cedar mill remnants utilized according to the present invention suppress both the weed growth and the progation of insect pests. Accordingly, applications of insecticides to potato fields cultivated in accordance with the teachings of the present invention are unnecessary to the achievement of a high crop yield. This is not to say that use of conventional insecticides and fertilizers is undesirable. While it appears that the cedar mulch of the invention improves potash content, some soils may still require potash with the mulch for good results in growing some types of crops.

The invention is also useful in that the ground cedar material may be used as a mulch for lawns to enhance either the growth of new grass from seeds or to enhance the growth of existing grass. An added feature that it provides when employed in this manner is that it is an attractive ground cover and it inhibits the growth of weeds. It can also provide a protective covering for the packaging and planting of bare root shrubs and trees. The cedar timber remnant material may also be used extensively in organic gardening without the need for insecticides.

A further feature of the invention is that it can be practiced either with seeds buried in the soil slightly below ground level and then covered with a layer of the cedar timber remnants, or with seeds placed directly on the ground and then covered by a layer of the cedar mill debris. For example, seed potatoes can be planted five to eight centimeters below the ground surface. The planting area is then covered with a layer of the cedar remnant material to a depth of about 13 centimeters. Alternatively, seed potatoes are placed directly on the ground at laterally separated intervals and covered with the cedar trimmings to the same level. Both forms of planting result in an improved yield over conventional practices which do not employ a soil conditioning treatment according to the present invention. Because the cedar mulch itself supports crop growth, potatoes can be grown even on untillable ground, over clay, rocky ground, and over poor soil.

Still another feature of the present invention is that it increases the range of climatic conditions to which a planting area can be subjected and still produce satisfactory crop yields. The mulch treatment described herein aids vegetables normally grown in cooler wetter, climates to be grown more successfully in rather warm, dry environments. For example, by employing the cedar timber remnants in the manner described, potatoes can be grown at locations where daytime ambient air temperatures above the planting area exceed 37° C. on repeated occassions. Such climatic conditions are normally considered unsuitable to support the planting of potatoes, since these vegetables have always been considered to prefer cool weather. However, because of the improved moisture retention capability and the insulating properties of the cedar remnants, successful planting of potatoes is enhanced in such warm weather areas.

The method of the invention may also be performed by grinding the cedar timber remnants to a very fine mulch which is then used as a potting soil. This potting soil may then be used to germinate seeds or support the growth of the plants of various vegetables and flowers from tubers. If desired or necessary, the finely ground cedar mulch may be mixed with an alkaline additive, such as lime, to reduce its acid level and bring the pH level up to a value of 7.

The invention has successfully been used to promote the growth of Irish Potatoes, including Pontiac Red Potatoes, as well as other potato varieties. While normal yields of such potatoes using conventional agricultural techniques are in the area of one pound (0.45 kilograms) per square foot, the plantings utilizing the present invention have resulted in projected yields of two to three pounds (0.91–1.36 kilograms) per square foot of number one potatoes. Number one potatoes are those potatoes which bear no discernible rock marks, which do not have jagged edges or distorted shapes. Number two potatoes contain some rock marks and jagged edges and are generally smaller in size than number one potatoes. Number one potatoes are preferred for human consumption because their size and shape provides a much greater usable food volume as contrasted with number two potatoes, or culls, which are small potatoes of highly distorted configuration and which provide only minimum usable food after peeling and washing. Because potatoes grown according to the present invention may be cultivated from seed potatoes planted directly on the surface of the ground, which is thereafter covered with the cedar remnant mulch, the proportion of number 1 potatoes in the overall yeild is substantially improved. By planting directly on the surface of the ground, the rock marks and other disfigurations which occur to potatoes forcing their way through the soil in growing pattern are avoided.

Attention has heretofore been directed to the use of the method of the invention for growing potatoes. It is to be understood, however, that pulverized cedar timber trimmings may likewise be employed to aid the growth of other vegetables, and flowers. The growth of such vegetables entirely within a layer of the cedar trimmings has been achieved to a degree sufficient to prove the utility of the invention in this connection. All of the features which the cedar trimmings provide in aiding the growth of potatoes likewise are beneficial to the growth or other vegetables and flowers.

The following specific examples are illustrative of the agricultural techniques which may be used in performing the present invention, but is to be understood that the invention is not to be limited to the specific details of this examples.

EXAMPLE I

Two four by four foot (1.24 meter square) agricultural test plots were outlined. In one of the test plots, sixteen pieces of sprouted potato were located at laterally separated intervals and were covered to a depth of about ten centimeters by a layer of cedar timber remnants. The cedar timber remnants utilized for the mulch were obtained from a lumber mill, and were not processed further except for grinding in a mulcher to produce fiberous material approximately one-half to one inch (1.27–2.54 centimeters) in length. The mulcher employed was an MTD Shredder Model No. 244,650, manufactured by MTD Corporation of Cleveland, Oh.

In the second test plot, sixteen pieces of number one seed potato were likewise spread laterally at intervals and were covered by a mulch to a depth of about ten centimeters of redwood compost. The redwood compost was comprised of a mixture of redwood bark, sawdust and wood chips, treated and processed by Arcata Redwood Company Arcata, CA. 75521. It was noted that the redwood mulch seemed to contain a considerably greater portion of fine, powdery material as contrasted with the cedar mulch. When the wind blew, clouds of dust emanated from the redwood mulch covered plot to a much greater degree than from the cedar mulch covered plot.

After planting the seed potatoes, the plots were soaked with water once approximately every ten days. After twenty one days it was observed that the plot covered with cedar mulch was exhibiting a good, healthy growth of leaves of potato plants throughout, while the plot covered with the redwood mulch had only three greens showing. Also, the cedar mulch appeared to be retaining water better than did the redwood mulch, and did not raise dust clouds with the wind nearly as much as did the redwood mulch. No weeds were present in the plot containing the cedar mulch, although some weeds were apparent in the plot covered with the redwood mulch.

After sixty eight days soil tests were taken of the test plots and also of the soil between the test plots. The test showed that the bare soil had a pH of 6 while the cedar mulch covered soil and the redwood mulch covered soil both had a pH of 5.25. This indicated that the original soil was slightly acidic, and that the use of the mulch increased the acid content of the soil somewhat, approximately the same in the redwood mulched soil as in the cedar mulched soil. In addition, potash measurements were also taken in terms of the relative amount of potash deficiency, with a value of zero indicating no deficiency in potash level. In the bare soil sample, the potash deficiency level was eight while the deficiency level of the cedar mulch plot was 12. The deficiency level of the redwood mulch was 16. The increase in deficiency levels in potash in the two plots in which seed potatoes were planted may be accounted for by the extraction of potash from the soil by the growing potatoes.

The phosphate deficiency level was also measured. The phosphate deficiency in the bare soil was 10 while the phosphate deficiency in the cedar mulched plot was 4 and the phosphate deficiency in the redwood mulched plot was 8. This indicated that while the cedar mulch had actually added a significant amount of phosphate to the soil, the redwood mulch had improved phosphate content only moderately relative to the bare soil sample. The potash, nitrogen and phorphous measurements were indicative of the relative amounts of soil deficiencies for the various mineral requirements. The results showed that the cedar mulched soil exhibited far less of a requirement for fertilizer than either the redwood mulched plot or the bare soil sample.

No fertilizer was applied to either plot, nor was any insecticide applied. 73 days after planting the two plots were harvested as premature crops, the results indicating only a relative comparison, and not a comparison to conventional potato cultivation practices where potato plants are allowed to grow in a four to five month growing cycle. The yield from the cedar mulched plot was 105 potatoes totaling 1.93 kilograms while the yield from the redwood mulch plot was 31 potatoes totaling 0.65 kilograms. This result indicated a definite superiority of the cedar mill remnant mulch over the redwood mill mulch. In addition, the proportion of number 1 potatoes from the cedar mulch plot to the redwood mulched plot was about 2:1. Also, potatoes from the cedar mulched plot exhibited far less insect damage than did the potatoes of the redwood mulched plot. Potatoes from the cedar mulched plot showed no signs of insect infestation, while 6 potatoes from the redwood mulch plot showed insect damage of fungus damage. Furthermore, the potato root structure of those plants grown in the cedar mulch plot was about 90% confined within the cedar mulch, thereby illustrating the growth and nutrient support provided by that mulch. In contrast, the root system of the plants in the redwood mulch was quite poor, with the majority of the root system lying below the mulch layer in the native soil.

EXAMPLE II

A two feet by two feet test plot was outlined in bare soil, the measurements of which showed a pH of 6, a potash deficiency level of 8, a nitrogen deficiency level of five and a phosphorous deficiency level of 10. Seed potatoes were planted in this plot at laterally spaced intervals, laid directly on the surface of the bare ground. The plot was then covered with about thirteen centimeters of cedar mill remnants, including bark, sawdust, wood chips and other debris from cedar timbers. This material was not ground, as was the cedar mill remnants in Example I. Rather, the cedar material was utilized in the form in which it was received from the mill. Thereafter, no fertilizer was applied nor was any insecticide applied. The plot was soaked with water about once every ten days. Throughout the course of growth, the potato plants sprouting from the plot appeared healthy and the foliage was quite luxuriant, despite ambient air temperatures at the plot which repeatedly exceeded 37° C. during the daytime. Ninety four days after planting all of the plants in the plot were harvested. The yield was forty five potatoes varying in size from very small to quite large, the largest of which was approximately 0.34 kilograms in weight. The total yield was 2.84 kilograms pounds.

EXAMPLE III

Two plots were delineated in the same soil area having the same general soil conditions as the soil in Example II above. The plots both had dimensions of about four by eight feet. About one kilograms of peanuts, both shelled and unshelled were spread at lateral intervals on the surface of the soil in each of the plots. One plot was then covered with ground cedar mill remnants while the other was covered with ground redwood mill remnants, both in the manner explained in detail in connection with Example I. The plots were checked after seventeen days and it was determined that both the shelled and unshelled peanuts were sprouting in both of the plots, but that sprouts from the redwood covered plot had not yet appeared through the surface to reach the air. Twenty days after planting the peanuts were again checked and the plants in the plot covered with cedar mulch had sprouted above the surface of the mulch and had reached a height of about three inches. The peanuts in the redwood mulched plot had sprouted, but the plants had not reached the air. After twenty nine days the plants in the redwood mulched plot rarely reached the surface of the mulch and appeared yellow and sickly, while the peanut plants in the cedar mulch extended about 15 centimeters above the mulch surface and appeared rich and green and quite healthy. This showed that peanuts could be grown in either a ground redwood remnant mulch or a ground cedar remnant mulch, but that they thrived better in the cedar mulch.

EXAMPLE IV

An experiment was performed which illustrated the utility of cedar timber remnants in initiating the germination of seeds of vegetables and initiating new growth on other vegetable tubers. A quantity of the cedar timber remnants was ground to a fine mulch in a conventional kitchen blender. A blender, model no. 215 rated at 350 watts and manufactured by the Hamilton Beach Company of Chicago, IL. was used for this purpose. The ground cedar mulch was used as a potting soil for radish, cucumber peas and grass seed and turnip seeds. The grass seed was laid on native soil with a ½ inch layer of the finely ground cedar mulch above it. The other seeds were planted directly in the finely ground cedar mulch at a depth of ½ inch. All plantings were performed at approximately 10 p.m. on the first day.

After exposure to the day time sunlight and keeping the potting soils moist for thirty five hours, it was determined that the radish seeds had germinated. Sixty two hours after planting it was determined that the peas and cucumber seeds had germinated and the turnip seeds had sprouted and broken through to the surface of the ground mulch. At this time the radish plants had broken through the surface of the ground mulch and had sprouted two leaves. After eighty seven hours it was determined that the grass seed had germinated.

EXAMPLE V

Ground cedar mulch was prepared as in Example IV above. Begonia tubers were planted using only the finely ground mulch in a clay pot. Four days after planting the begonia tubers had sprouted and broken through the surface of the mulch to the air.

While the invention has been described in the examples and explained in connection with plantings of particular vegetables and flowers according to specific conditions, it should be understood that these specific examples and illustrations are for explanatory purposes only. The invention has a wide range of application, both to enhance the growth of tuberous vegetables and to enhance the germination and growth of other vegetables and desirable plant life. Accordingly, the invention should not be considered limited to the specific examples and uses referred to in detail herein. Rather, the invention is defined in the claims appended hereto.

I claim:

1. A method of enhancing the growth of desirable vegetation in a growth supporting medium comprising applying to said medium ground remnants of incense cedar timber including bark, sawdust and wood.

2. The method of claim 1 further characterized in that said medium includes soil and further comprising planting shrubs in said medium.

3. The method of claim 1 further characterized in that said desirable vegetation is grass.

4. The method of claim 1 further characterized in that said cedar timber remnants are ground into small particles.

5. The method of claim 4 further characterized in that said cedar timber remnants are ground to produce fibrous material approximately one-half to one inch in length.

6. The method of claim 1 further characterized in that said medium includes soil and further comprising planting trees in said medium.

7. The method of claim 1 further characterized in that said medium includes soil and further comprising planting plants in said medium.

8. A method of enhancing the growth of desirable vegetation in a growth supporting medium which includes soil that is otherwise untreated with pesticides comprising applying to said medium ground remnants of incense cedar timber including bark, sawdust and wood.

* * * * *

UNITED STATES PATENT OFFICE
CERTIFICATE OF CORRECTION

Patent No. 4,253,273          Dated  March 3, 1981

Inventor(s)  DAVID H. REES, Jr., et al

It is certified that error appears in the above-identified patent and that said Letters Patent are hereby corrected as shown below:

At column 2, line 61, after "concern.", the initial portion of a new paragraph should be inserted, reading as follows:

-- One note of caution is that the cedar mill remnants should not be intermixed with the trimmings of other types of wood which could be harmful to crop growth. The trimmings of incense cedar may be utilized in accordance with the present invention. Incense cedar is widely utilized in the wood pencil industry. --

The following material should be deleted from lines 61-64:

"of incense cedar may be utilized in accordance with the present invention. Incense cedar is widely utilized in the wood pencil industry."

Also, the word "from" in line 64 should not be capitalized.

Signed and Sealed this

*Fourteenth* Day of *July 1981*

[SEAL]

*Attest:*

*Attesting Officer*

GERALD J. MOSSINGHOFF

*Commissioner of Patents and Trademarks*